United States Patent [19]

Harben, Jr. et al.

[11] Patent Number: 4,574,427
[45] Date of Patent: Mar. 11, 1986

[54] NECK PULLING AND CROPPING SYSTEM

[76] Inventors: Grover S. Harben, Jr., Edgewater Ave.; Julius A. Ellis, Rte. 8, Price Rd., both of Gainesville, Ga. 30501

[21] Appl. No.: 567,750

[22] Filed: Jan. 3, 1984

[51] Int. Cl.$^4$ ............................................. A22C 21/00
[52] U.S. Cl. ............................................ 17/11; 17/12
[58] Field of Search ........................... 17/11, 12, 11.3

[56] References Cited

U.S. PATENT DOCUMENTS

| | | | |
|---|---|---|---|
| 3,510,907 | 5/1970 | Rejsa et al. | 17/11 |
| 4,322,872 | 4/1982 | Meyn | 17/12 |
| 4,418,444 | 12/1983 | Meyn et al. | 17/11 |

Primary Examiner—Willie G. Abercrombie
Attorney, Agent, or Firm—B. J. Powell

[57] ABSTRACT

A system for removing the neck, windpipe and esophagus from poultry where the neck is broken with an opening through the neck skin at the break which includes a neck removal machine and a pulling machine past which the poultry is moved on an overhead conveyor. The neck removal machine holds the windpipe and esophagus at the neck break and engages the broken end of the neck with a finger member to displace the neck from the poultry to break the neck skin and release the neck while leaving the windpipe and esophagus intact. The pulling machine engages the windpipe and esophagus to pull them out of the poultry carcass which also removes any crop still attached to the esophagus.

14 Claims, 12 Drawing Figures

NECK PULLING AND CROPPING SYSTEM

BACKGROUND OF THE INVENTION

This invention relates generally to the processing of poultry and more particularly to the removal of the neck, windpipe and esophagus from the poultry carcass.

In the processing of poultry, it is typical to remove the neck from the poultry carcass. Subsequently the windpipe or trachea or gullet along with the crop and esophagus are removed from the poultry carcass for disposal. Machines have been developed to break the necks of the poultry during the processing operation. In these machines, the neck is broken at its junction with the body. This also serves to cut an opening in the neck skin of the poultry but leaves that portion of the neck skin on the front of the neck where the windpipe and esophagus are located intact so that the neck is held onto the poultry carcass through this unsevered piece of neck skin. This neck breaking operation does not sever the windpipe or esophagus so that they remain attached to the poultry carcass and pass under the neck skin.

While the neck breaking operation has been relatively successful, the mechanization of the removal of the neck and the separate removal of the windpipe and esophagus has not met with similar success. This is because prior art machines have had difficulty in keeping the windpipe and esophagus with the body of the poultry carcass while the already broken neck was pulled from the carcass. As a result, machines which sought to mechanically and separately remove the broken necks and the windpipe and esophagus from the poultry carcasses have not met with commercial success.

SUMMARY OF THE INVENTION

These and other problems and disadvantages associated with the prior art are overcome by the invention disclosed herein by the provision of an apparatus and method which is capable of separately removing the neck and then the windpipe and esophagus from poultry carcasses in a reliable manner so that the manual labor required is minimized. The apparatus of the invention is simple in construction thereby minimizing initial investment cost and also minimizing the operational and maintenance costs associated therewith.

The method of the invention includes breaking the necks of the poultry while the poultry is conveyed along a processing path in a head lowermost position while at the same time cutting an opening through the neck skin at its juncture with the body of the carcass. This breaks the neck without severing the windpipe and esophagus and leaves the neck connected to the carcass of the bird through an unsevered portion of the neck skin. Subsequently, the viscera is removed through the rear end of the bird. As the viscera is pulled through the rear end of the bird, the windpipe is broken leaving that portion passing under the neck skin. This operation at least loosens the crop and also removes it through the rear end of the bird most of the time. A certain pecentage of the time, however, the crop is broken from the rest of the viscera leaving it still attached to the esophagus passing under the neck skin.

Subsequently, the windpipe and esophagus are gripped and pulled downwardly to pull the windpipe and esophagus out of the carcass. If the crop remains after the viscera is removed, it will be pulled out of the carcass by the esophagus.

The apparatus of the invention includes generally a neck removal machine which separates the neck from the carcass while leaving the windpipe and esophagus still attached to the carcass and a pulling machine which engages the windpipe and esophagus to pull them out of the carcass. The neck removal machine has an upper set of endless gripping assemblies that grip the unsevered portion of the neck skin along with the windpipe and esophagus to keep them in place while the neck is pulled. A lower set of endless pulling assemblies engage the neck and neck skin without engaging the esophagus and windpipe and displace the neck and neck skin downwardly to break the unsevered portion of the neck skin and strip the windpipe and esophagus out from under the neck skin. The pulling machine has a set of endless gripping assemblies that grip the windpipe and esophagus after release by the neck removal machine and pull downwardly thereon to pull the windpipe and esophagus out of the poultry carcass. If the crop has not already been removed, it will be pulled out of the carcass by the esophagus.

These and other features and advantages of the invention will become more clearly understood upon consideration of the following detailed description and accompanying drawings wherein like characters of reference designate corresponding parts throughout the several views and in which:

BRIEF DESCRIPTION OF THE DRAWINGS

FIG. 8 is an enlarged cross-sectional view taken generally along the line 8—8 in FIG. 3;

FIG. 9 is a top plan view with the covers removed of the pulling machine of the invention;

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
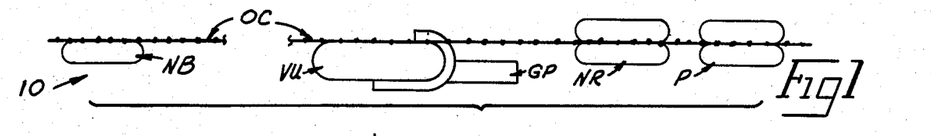
FIG. 1 is a schematic drawing illustrating the invention installed in a poultry processing plant.

FIG. 1 schematically illustrates a system 10 incorporating the invention. The poultry processing plant has an overhead conveyor OC from which the poultry carcasses are suspended in a head lowermost position and transported through the plant along a prescribed processing path. As the poultry carcasses are conveyed by the conveyor OC, they are successively moved past a neck breaking station NB where the necks of the poultry are broken and an opening is made in the neck skin at the point where the neck is broken. While the poultry carcasses may be moved through intermediate stations by the conveyor OC, they eventually pass a viscera unloading station VU where the gizzard and other viscera still attached to the carcass through the esophagus and crop is pulled from the poultry carcass and deposited in a gizzard processing machine GP for processing. This viscera unloading operation loosens the crop and usually pulls the crop out through the rear opening in the carcass. The poultry carcass is then conveyed past a neck removal station NR where the neck is removed from the poultry carcass while leaving the windpipe and any portion of the esophagus still present attached to the body of the poultry carcass. The overhead conveyor OC then moves the poultry past the pulling station P where the windpipe and any portion of the esophagus still remaining attached to the body of the poultry carcass are pulled therefrom. If the crop remains attached to the esophagus, it will be removed along with the esophagus.

The neck breaking station NB includes a neck breaking machine of known construction which serves to engage the neck of the bird at the juncture between the neck and the body of the poultry carcass and to break the neck bone at that position. Additionally, the machine at the neck breaking station NB cuts a hole in the neck skin at the point where the neck is broken yet leaves the neck attached to the body of the poultry carcass through an unsevered piece of neck skin along the front or breast side of the neck to prevent the windpipe or trachea and gullet or esophagus from being severed at this point. The neck is broken and the opening is made from the back side of the bird since the windpipe and esophagus pass down the front side of the neck. An example of a neck breaking machine which will perform this function is commercially available from Centennial Machine Company, Inc. of Gainesville, Ga. as the model 401 Neck Breaker. Thus, as the poultry is moved away from the neck breaking station NB by the overhead conveyor OC, the neck of the poultry will still be attached to the poultry carcass through the unsevered portion of the neck skin.

By the time the poultry carcass reaches the unloading station VU, the poultry will already have been eviscerated with the viscera hanging over the back of the poultry carcass but still connected to the poultry carcass through the esophagus and crop. As the poultry with the viscera dangling over the rear end of the bird is moved past the viscera unloading station VU, the gizzard and attached viscera may be pulled from the poultry carcass manually or unloaded with an unloading machine such as that illustrated in copending application Serial No. filed on even date with this application, entitled "Viscera Processing System" and owned by the assignee of this application. In the removal of the viscera from the poultry carcass at the viscera unloading station VU, a force is exerted on the crop through the esophagus connecting the crop to the gizzard to at least loosen the crop in its cavity in the poultry carcass. In most instances, the crop will be pulled out of the rear end of the bird along with the esophagus when the viscera is unloaded. Sometimes, however, the esophagus may break between the crop and gizzard so that the crop is left in the poultry carcass with the esophagus extending up the neck in the poultry. It will be appreciated that the gizzard and attached viscera separated from the poultry carcass at the viscera unloading station VU is fed to the gizzard processing machine GP. The gizzard processing machine GP is of the type that both removes the viscera connected to the gizzard and processes the gizzard into an edible produce as is known in the art.

The neck removal station NR includes a neck removal machine 11 best seen in FIGS. 2-6. The neck removal machine 11 includes a support frame 12 which mounts an upper set of endless gripping assemblies 14 thereon and a lower set of endless pulling assemblies 15 thereon below the gripping assemblies 14. As will become more apparent, the upper gripping assemblies 14 engage the unsevered portion of the neck skin of the bird along with the windpipe and esophagus to support same at a fixed position relative to the carcass as the overhead conveyor OC moves the bird past the machine 11. The lower pulling assemblies 15 engage the neck and pull it downwardly away from the poultry carcass and upper assemblies 14 break the unsevered portion of the neck skin below the upper assemblies 14. This serves to separate the neck and neck skin from the poultry carcass while at the same time stripping the windpipe and esophagus out from under the neck skin so that they remain attached to the poultry carcass.

Figure 2:
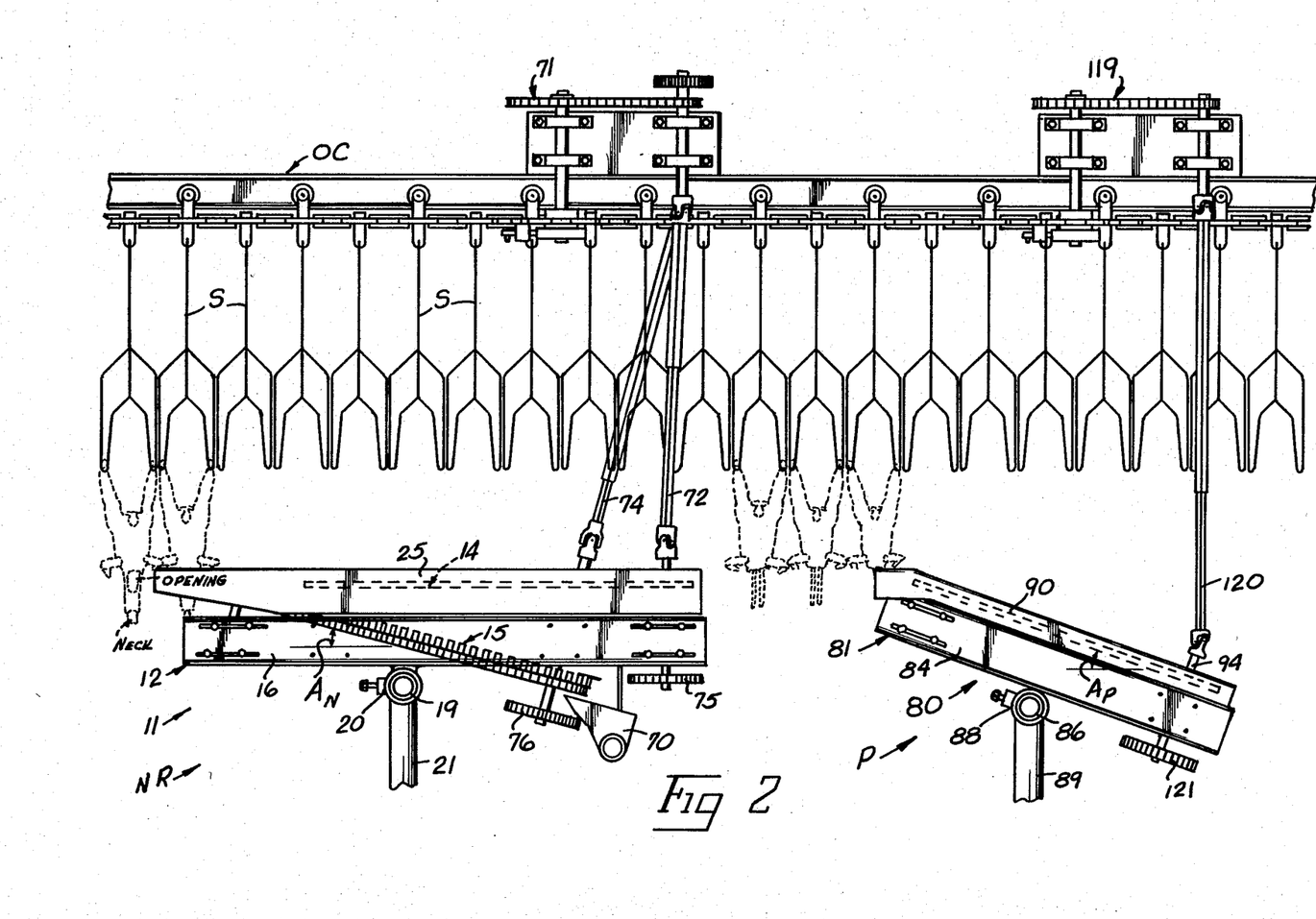
FIG. 2 is an elevational view illustrating machines embodying the invention.
Figure 3:
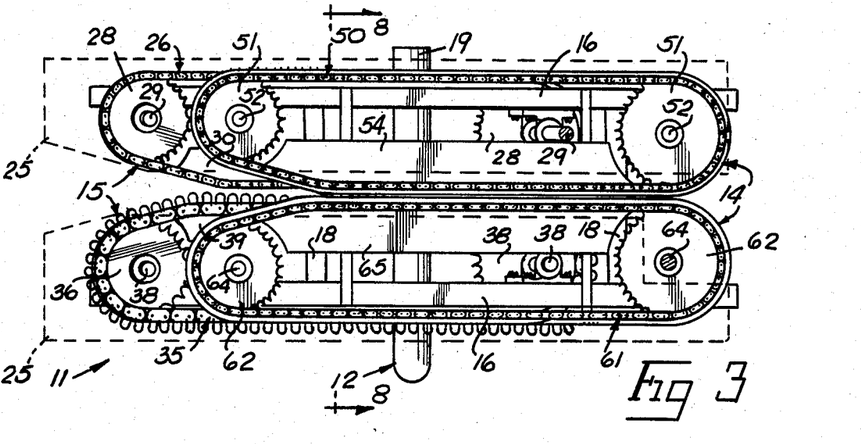
FIG. 3 is a top plan view with the covers removed illustrating the neck removal machine of the invention.

The support frame 12 includes a pair of spaced apart, aligned side beams 16 interconnected by slide tubes 18 so that the side beams 16 can be moved toward and away from each other yet alignment is maintained by the slide tubes 18. The side beams 16 are also mounted on a cross tube 19 with appropriate brackets 20 so that the side beams 16 can be moved toward and away from each other yet be selectively locked in place on the cross tube 19 by the brackets 20. It will also be appreciated that the side beams 16 can be pivoted as a unit around the cross tube 19 and the brackets 20 used to lock the side beams 16 at different angles with respect to the horizontal. The cross tube 19 is supported on an appropriate leg 21 to support same in the processing plant. The assemblies 14 and 15 are mounted under appropriate covers 25 which define an elongate opening extending therebetween through which the neck of the poultry passes as it is conveyed by the overhead conveyor. Thus, it will be seen that the longitudinal axis of the machine 11 is aligned under the poultry processing path along which the birds are conveyed by the overhead conveyor OC.

The lower set of endless pulling assemblies 15 lie in a common plane in a side-by-side relationship so that the neck will be engaged therebetween. The plane of assemblies 15 angle downwardly from their upstream ends toward their downstream ends at an angle $A_N$ seen in FIG. 2. The upstream ends of the assemblies 15 are located at about the same height with respect to the overhead conveyor OC as the upper set of endless gripping assemblies 14 and engage the neck of the bird before assemblies 14.

One of the endless pulling assemblies 15 includes an endless holding chain 26 trained around upstream and downstream sprockets 28 whose support shafts 29 are rotatably journalled in bearings mounted on one of the side beams 16. It will be appreciated that the holding chain 26 lies in a plane which angles with respect to the horizontal at angle $A_N$ as seen in FIG. 2. The holding chain 26 is located on that side of the poultry processing path along which the breast side of the bird is moving so that its inboard flight is operatively associated with the neck of the bird as it passes through the neck removal machine 11. The inboard flight of the holding chain 26 is positioned by a keeper 30 so that the upstream portion of the inboard flight of chain 26 moves inwardly toward the poultry processing path and then moves along a path generally parallel to the poultry processing path but angled downwardly away from the body of the poultry from its upstream end toward its downstream end.

Figures 4, 5, 6, 7:
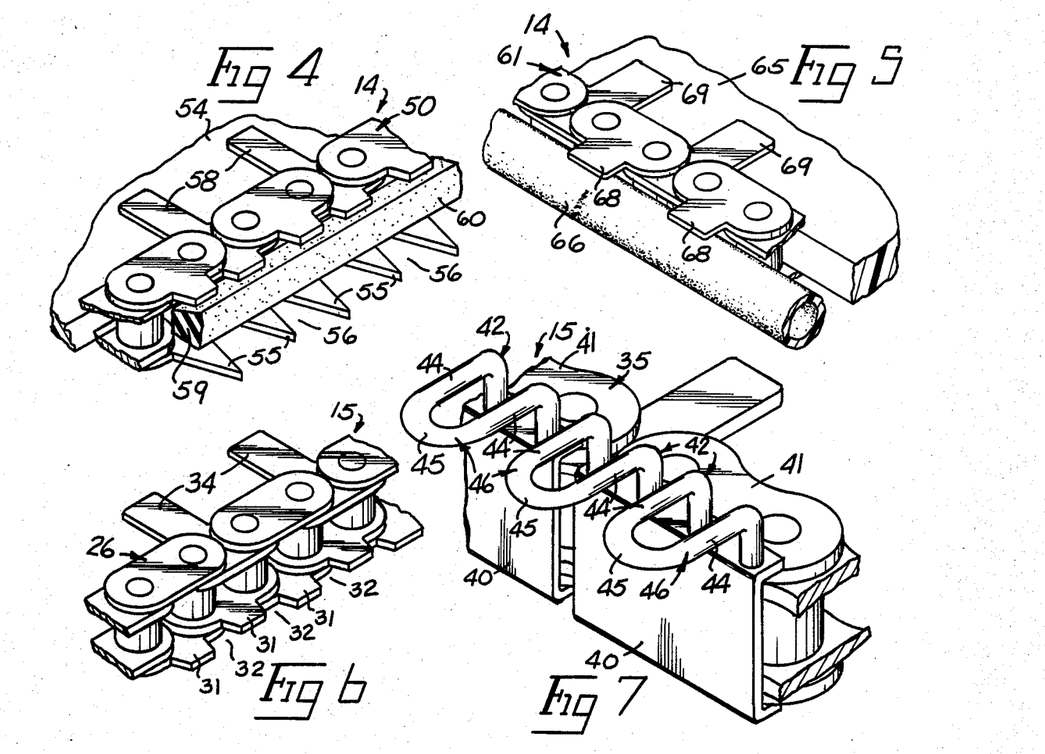
FIG. 4 is an enlarged perspective view illustrating one of the endless holding assemblies of the invention.
FIG. 5 is an enlarged perspective view illustrating the other endless holding assembly of the invention.
FIG. 6 is an enlarged perspective view illustrating one of the endless assemblies of the invention.
FIG. 7 is an enlarged perspective view illustrating the other endless pulling assembly of the invention.
Figure 4:
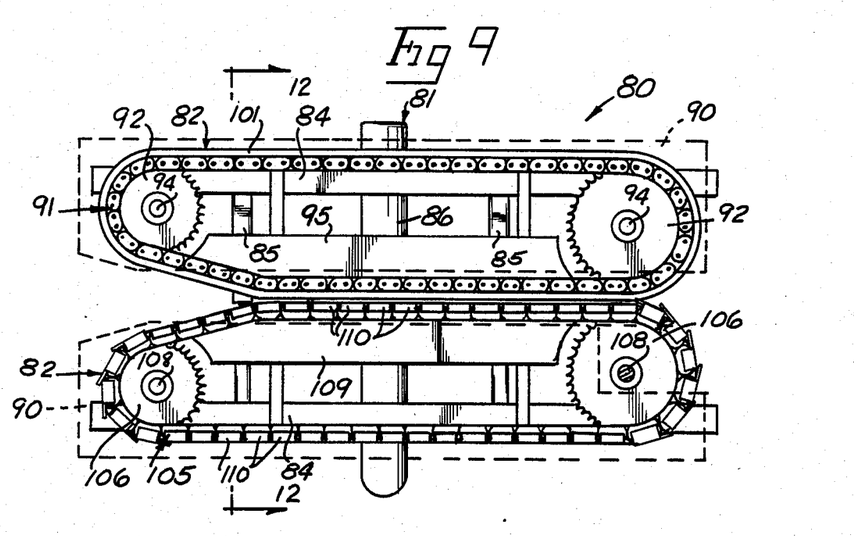

The chain 26 as seen in FIG. 6 is made with cut-off tapered tabs 31 along one edge thereof which project toward the neck of the poultry. The tabs 31 define notches 32 therebetween so that the neck skin can be engaged by the tabs 31 yet the windpipe and/or esophagus can be displaced under the neck skin until they are aligned with the notches 32 so that the neck and neck skin can be stripped from over the windpipe and/or esophagus. Typically, the tapered tabs 31 are located along the bottom edge of the chain 26. Keeper tabs 34 are provided on chain 26 to keep it trained on keeper 30.

The other lower pulling assembly 15 includes a finger chain 35 trained around spaced apart upstream and downstream sprockets 36 on shafts 38 where the shafts 38 are rotatably mounted in appropriate bearings on the other side beam 16 opposite the side beam 16 mounting the holding chain 26. The finger chain 35 is oriented along the same angle $A_N$ as the holding chain 26 and on the opposite side of the poultry processing path from the holding chain 26 so that the inboard flight on finger chain 35 faces the inboard flight of the holding chain 26. The neck of the poultry will pass between the inboard flights of the chains 26 and 35 and be gripped thereby. The inboard flight of the finger chain 35 is positioned by keeper 39 so that the upstream portion of the inboard flight of chain 35 moves inwardly toward the poultry processing path and then moves along a path generally parallel to the poultry processing path while being angled downwardly away from the body of the poultry from its upstream end toward its downstream end similarly to the chain 26 on the other assembly 15. Thus, the inboard flights of the chains 26 and 35 have an infeed portion which angle inwardly toward each other at the upstream end of the inboard flight and then move parallel to each other in vertical registration with the poultry processing path.

The finger chain 35 as seen in FIG. 7 is provided with backup plates 40 on each of the links 41 thereof oriented so that the backup plates 40 face the tapered tabs 31 on the holding chain 26 along with inboard flight of the chain 35. The top edge of the backup plates 40 are equipped with finger members 42 which have a pair of spaced apart legs 44 joined at the projecting end thereof by a curved bight 45 with the inboard ends of the legs 44 being fixedly attached to the backup plates 40. The legs 44 project upwardly from the backup plate 40 generally parallel to the backup surface thereon facing the chain 26 and are bent intermediate their ends to form a projecting section 46 therein extending generally perpendicular to and projecting out over the backup surface on the plate 40. The finger members 42 are positioned close together along the length of the chain 35 and are illustrated as two such finger members 42 being provided on each link 41 of the chain 35. The keepers 30 and 39 are adjusted so that the projecting sections 46 of the finger members 42 overlie the inboard flight of the chain 26 and are spaced thereabove a prescribed distance as will become more apparent. The chain 35 is also provided with keeper tabs 48 to keep it trained around the keeper 39.

Figures 10, 11, 12:
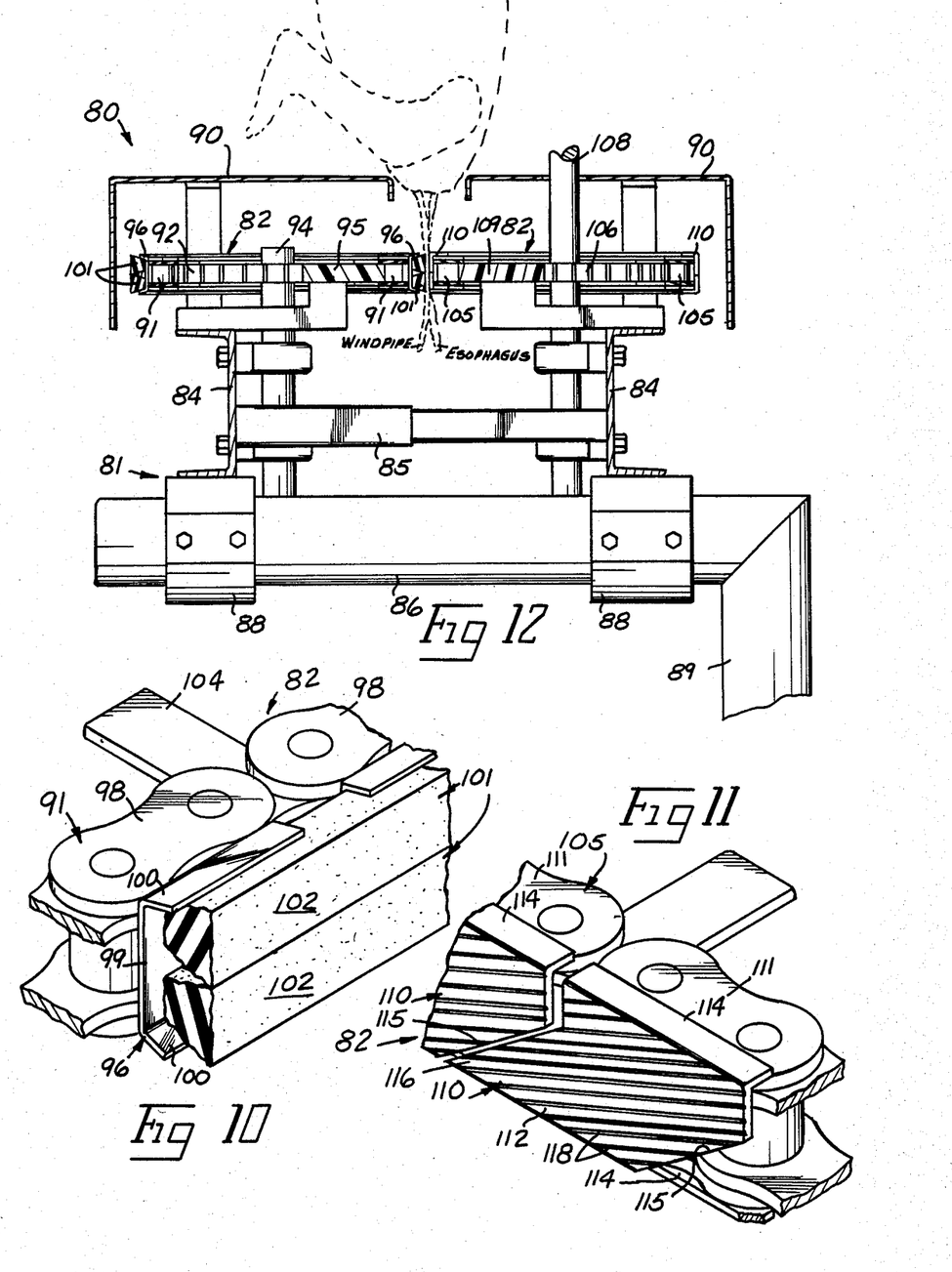
FIG. 10 is an enlarged perspective view illustrating one of the endless engagement assemblies of the pulling machine.
FIG. 11 is an enlarged perspective view illustrating the other endless engagement assembly of the pulling machine.
FIG. 12 is an enlarged cross-sectional view taken generally along the line 12—12 in FIG. 9.

As the poultry is conveyed in a head lowermost position through the machine 11, the upper ends of the chains 26 and 35 are oriented so that the projecting section 46 on one of the finger members 42 will pass into alignment with the opening in the neck skin formed by the neck breaking operation with the inboard flight of the chain 35 passing along the backside of the bird. The chains 26 and 35 are also adjusted so that the tabs 31 on the holding chain 26 and the backup plates 40 on the finger chain 35 move into alignment with the upper end of the broken section of the neck still held in the neck skin as best seen in FIG. 11. The spacing between the inboard flights of the chains 26 and 35 is selected so that the neck skin and neck of the bird will be caught between the tabs 31 on the chain 26 and the backup plates 40 on the chain 35. As the backup plates 40 press the neck toward the tabs 31 on the chain 26, the windpipe and esophagus will have a chance to shift circumferentially around the neck until they line up with the notches 32 between the tabs 31 and are thus not gripped between the chains 26 and 35. As the overhead conveyor OC continues to move the bird through the plant at a substantially constant height, the chains 26 and 35 are synchronously moved therewith lengthwise of the processing path and also moved downwardly with respect to the processing path so that the projecting section 46 extending into the opening above the broken neck of the bird catches the upper end of the broken neck of the bird and forces it downwardly. The projecting section 46 also hooks over the neck skin at the opening cut therein to pull it downwardly assisted by the tabs 31 on the holding chain 26 and the backup plates 40 on the finger chain 35. This eventually causes the unsevered portion of the neck skin to break to release the neck and neck skin from the poultry carcass yet the windpipe and esophagus can slide up between the neck skin and neck so that the neck and neck skin can be stripped around the windpipe and esophagus.

The upper set of endless holding assemblies 14 also lie in a common plane in a side-by-side relationship so that the neck skin will be engaged therebetween. The assemblies 14 typically lie in a horizontal plane with their upstream ends sufficiently far downstream of the upstream ends of the lower pulling assemblies 15 to clear them.

The endless holding assembly 14 on the breast side of the poultry includes an endless perforating chain 50 trained around upstream and downstream sprockets 51 whose support shafts 52 are rotatably journalled in bearings mounted on side beam 16 mounting the holding chain 26. The inboard flight of the perforating chain 50 is positioned by a keeper 54 so that the upstream portion of the inboard flight of chain 50 moves inwardly toward the poultry processing path and then moves along a path generally parallel to the poultry processing path.

The perforating chain 50 as seen in FIG. 4 is provided with a plurality of tapered spikes 55 on the links of the chain which project toward the poultry as the spikes 55 move along the inboard flight of the perforating chain 50. The spikes 55 define notches therebetween. It will be appreciated that the spikes 55 can be pressed through the unsevered portion of the neck skin in alignment therewith as the spikes move along the inboard flight of the perforating chain 50 without the spikes 55 piercing the windpipe and/or esophagus since the cross sectional shape thereof causes them to be displaced until they are aligned with the notches 56 between the spikes. Keeper tabs 58 may be provided on the chain 50 to keep the chain 50 trained around the keeper 54. To cushion the engagement between the perforating chain 50 and the neck skin on the bird, a resilient belt 59 is provided which is carried in the chain 50 immediately above the tapered spikes 55 thereon. This serves to allow the neck skin to be gripped by the upper holding assemblies 14 without damaging the windpipe and/or esophagus as will become more apparent. The particular belt 59 illustrated has a flat gripping surface 60 generally normal to the plane of the spikes 55.

The other upper holding assembly 14 includes a gripping chain 61 trained around spaced apart upstream and downstream sprockets 62 on shafts 64 rotatably journalled in bearings mounted on the side beam 16 mounting the finger chain 35. The gripping chain 61 is oriented in the same generally horizontal plane with the perforating chain 50 with its inboard flight located in opposition to the inboard flight of the perforating chain 50. The inboard flight of the gripping chain 61 is positioned by a keeper 65 so that the upstream portion of the inboard flight moves inwardly toward the poultry processing path and then moves along a path generally parallel to the poultry processing path in opposition to the inboard flight of the perforating chain 50.

A tubular resilient belt 66 as seen in FIG. 5 is mounted on the chain 61 so that the belt 66 faces the belt 59 on the perforating chain 50 along the inboard flight of chain 61. The belt 66 is held in position by short positioning tabs 68 on the links of the chain 61. The tabs 68 are shorter than the cross-sectional diameter of the belt 66 so that the belt 66 projects outwardly of the ends of tabs 68. Keeper tabs 69 may be provided on chain 61 to keep the chain 61 trained on the keeper 65.

The keepers 54 and 65 are adjusted so that the tubular belt 66 engages the gripping surface 60 on the belt 59 carried by the perforating chain 50 with the spikes 55 on the chain 50 extending under the tubular belt 66 on the gripping chain 61. The resiliency of the belts 60 and 66 is such that the belt 66 can engage the windpipe and esophagus without damaging the windpipe and esophagus as it is gripped between the belts 59 and 66. Since the inboard flights of the belts 59 and 66 are moving along paths spaced a constant distance from the overhead conveyor OC, the chains 50 and 61 serve to grip the unsevered portion of the neck skin at the opening in the neck skin above the neck pulling assemblies 15 to keep the windpipe and esophagus fixed with respect to the body of the carcass. As the belt 66 forces the neck skin against the belt 59, the tapered spikes 55 will be forced through the unsevered portion of the neck skin immediately below the position where the neck skin is gripped between belts 59 and 66. This serves to make perforations in the neck skin and weaken it along the line of the spikes 55 so that the downward motion of the finger members 42 and holding chain 26 serve to break the unsevered portion of the neck skin along the perforation formed by the spikes 55. This serves to release the neck with the neck skin thereon. As the finger members 42 and holding chain 26 continue to move downwardly holding the separated neck and neck skin therebetween, the windpipe and esophagus will be stripped from between the neck and neck skin past the tabs 31 on the holding chain 26.

A water flume 70 seen in FIG. 2 is provided under the downstream ends of the neck pulling assemblies 15 so that the separated neck and neck skin will drop therein upon being released from between the backup plates 40 and the holding chain 26 to be delivered for giblet processing. As the carcass moves out of the neck pulling machine 11, the perforating chain 50 and gripping chain 61 pass around the downstream sprockets mounting same and away from each other so that the neck skin as well as the windpipe and esophagus are released for passage along with the poultry carcass by the overhead conveyor OC.

To drive the upper and lower assemblies 14 and 15 an idler unit 71 seen in FIG. 2 is provided which is driven from the overhead conveyor OC and has a pair of output shafts. One of the output shafts is connected to the upper holding assemblies 14 through a slip joint extension 72 while the lower pulling assemblies 15 are driven from the other output shaft through a slip joint extension 74. To synchronously drive both of the upper holding assemblies 14, transfer sprockets 75 are provided which connect the shafts 29 and 38 at the downstream ends of the assemblies 14 while transfer sprockets 76 connect the shafts 52 and 64 at the downstream ends of the lower pulling assemblies 15 as best seen in FIG. 2. Thus, it will be seen that the upper and lower assemblies 14 and 15 are always synchronously driven with respect to the movement of the poultry by the overhead conveyor OC.

The pulling station P includes a windpipe and crop pulling machine 80 best seen in FIGS. 2 and 9-12. The pulling machine 80 includes generally a support frame 81 which mounts a set of endless engagement assemblies 82 thereon. The endless engagement assemblies 82 engage the windpipe and esophagus dangling from the poultry carcass and pull them downwardly away from the poultry carcass to pull the windpipe and esophagus along with any crop attached to the esophagus from the poultry carcass.

The support frame 81 includes a pair of spaced apart aligned side beams 84 that are interconnected by slide tubes 85 so that the side beams 84 can be moved toward and away from each other while alignment is maintained by the slide tubes 85. The side beams 84 are rotatably mounted on a cross tube 86 with set collars 88 so that the side beams 84 can be moved toward and away from each other and selectively locked into position on the cross tube 86 by the set collars 88. The set collars 88 also allow the side beams 84 to be pivoted as a unit around the axis of the cross tube 86. The cross tube 86 is supported on an appropriate leg 89 to support same in the processing plant.

The engagement assemblies 82 are mounted under appropriate covers 90 which define an elongate opening extending therebetween through which the windpipe and esophagus of the poultry passes and is conveyed by the overhead conveyor OC. The longitudinal axis of the pulling machine 80 is aligned under the poultry processing path along which the birds are conveyed by the overhead conveyor OC so that the windpipe and esophagus will pass through the opening between the covers 90 to be engaged between the endless engagement assemblies 82 as will become more apparent.

The engagement assemblies 82 lie in a common place in a side-by-side relationship so that the windpipe and esophagus will be engaged between the inboard flights thereof. The plane of the assemblies 82 angles downwardly from the upstream ends of the assemblies 82 toward the downstream ends at an angle $A_P$ seen in FIG. 2 with respect to the horizontal. The angle $A_P$ is selected to give a sufficient vertical displacement of the windpipe and esophagus by the endless engagement assemblies 82 to pull them from the poultry carcass.

One of the endless engagement assemblies 82 includes an endless backup chain 91 trained around upstream and downstream sprockets 92 whose support shafts 94 are rotatably journalled in bearings mounted on one of the side beams 84. The inboard flight of the backup chain 91 is positioned by a keeper 95 so that the upstream portion of the inboard flight of chain 91 moves inwardly toward the poultry processing path and then moves along a path generally parallel to the poultry processing path but angles downwardly away from the body of the poultry from its upstream toward its downstream end.

The chain 91 as seen in FIG. 10 mounts a flanged clip 96 on each of the links 98 thereof. The flanged clip 96 is located on that side of the links 98 facing the poultry processing path as the links 98 pass along the inboard flight of chain 91. Each flanged clip 96 has a bottom support section 99 with top and bottom angled flanges 100 to define an outwardly opening belt receiving space between the support section 99 and flanges 100. A pair of V-belts 101 are mounted around the backup chain 91 and supported in the flanged clips 96 on the links 98 in a side-by-side relationship so that the belts 101 define a common inwardly facing planar support surface 102 facing the poultry processing path as the belts move along the inboard flight of the chain 91. The common support surface 102 is oriented generally vertically. This planar support surface 102 serves to engage one side of the windpipe and esophagus as will become more apparent. Keeper tabs 104 are provided on chain 91 to keep it trained on the keeper 95.

The other endless engagement assembly 82 includes an endless gripper chain 105 trained around upstream and downstream sprockets 106 whose support shafts 108 are rotatably journalled in bearings mounted on the other side beam 84. It will be appreciated that the gripper chain 105 lies in the same plane as the backup chain 91 and its inboard flight is positioned by keeper 109 so that the upstream portion of the inboard flight of chain 105 moves inwardly toward the poultry processing path and then moves along a path generally parallel to the poultry processing path but angled downwardly away from the body of the poultry from its upstream toward its downstream end. At the same time, the inboard flight of chains 91 and 105 are aligned with each other across the poultry processing path so that the windpipe and esophagus can be engaged therebetween.

The gripper chain 105 as seen in FIG. 11 mounts a gripping member 110 on each link 111 thereof so that the gripping members 110 face the poultry processing path as they move along the inboard flight of the chain 105. Each gripping member 110 includes a generally vertically oriented planar base section 112 which joins with attachment flanges 114 on opposite sides thereof that extend back over the chain link 111 and are attached thereto. The leading end of the base section 112 is provided with a tapered cutout 115 while the trailing end of the base section 112 is provided with a tapered extension 116 that has a size and shape matching that of the tapered cutout 115. When the gripping members 110 are in position on the links 111, it will be seen that the tapered extension 116 on the trailing end of each base section 112 will project into the tapered cutout in the base section 112 immediately trailing the first mentioned gripping member 110. This provides a continuous surface along the inboard flight of the gripper chain 105 even though the gripping members 110 are slightly spaced apart from each other. The base sections 112 along with the tapered extensions 116 are grooved as indicated at 118 with grooves that angle downwardly across the base section 112 from its upstream end toward its downstream end. This provides a grooved gripping surface on the gripping members 110 which cooperate with the support surface 102 on the other engagement assembly 82 to grip the windpipe and esophagus therebetween. The gripped area of the windpipe and esophagus is maximized to minimize the unit loading thereon so as to prevent inadvertant breakage of the windpipe and esophagus.

The upstream ends of the engagement assemblies 82 are adjusted so that the windpipe and esophagus dangling from the poultry carcass after it leaves the neck pulling machine 11 passes between the inboard flights of the backup chain 91 and gripper chain 105. This causes the planar support surface 102 defined by the belts 101 around the chain 91 and the grooved base sections 112 on the gripping members 110 on gripper chain 105 to engage the windpipe and esophagus therebetween to grip same. As the poultry continues to be moved by the overhead conveyor OC, the chains 91 and 105 are synchronously moved therewith but are displaced downwardly to pull the windpipe and esophagus out of the poultry carcass. The removed windpipe and esophagus along with any crop attached to the esophagus are dropped out from between the belts 101 and gripping member 110 as the chains 91 and 105 pass around the downstream sprockets mounting same to dispose of them.

To synchronously drive the chains 91 and 105 with the movement of the poultry, an idler unit 119 is provided which is driven by the conveyor and connected to one of the downstream support shafts 108 carrying the chain 105 by a slip joint extension 120 as best seen in FIG. 2. The lower end of the support shaft 108 driven by the extension 120 is drivingly connected to the downstream support shaft 94 carrying the backup chain 91 by transfer gears 121 so that both chains 91 and 105 will be synchronously driven.

In operation, the overhead conveyor OC moves the poultry past the neck breaking station NB and subsequently past the viscera unloading station VU. The neck removal station NR is located downstream of the viscera unloading station VU with the neck removal machine 11 located under the overhead conveyor OC so that the space between the covers 25 is aligned with the neck of the birds as they are conveyed by the overhead conveyor OC. It will be appreciated that the shackles S supporting the birds by the hocks limit the downward motion of the carcass of the bird.

The neck removal machine 11 is positioned so that the upper end of the broken neck passes into the space between the upstream ends of the holding chain 26 and finger chain 35 and so that the tabs 31 on the holding chain 26 and backup plates 40 on the finger chain 35 will catch the upper end of the neck and the skin therearound therebetween (see FIG. 8). Additionally, the height of the bird relative to the neck removal machine is selected so that the projecting section 46 on one of the finger members 42 carried by the finger chain 35 will extend into the opening in the neck skin above the broken end of the neck. As the chains 26 and 35 move downwardly at the angle $A_N$, the conveyor OC continues to move the poultry carcass along a constant height path so that the tabs 31 and backup plates 40 along with the finger members 42 force the neck and neck skin down and away from the carcass of the bird. It will be appreciated that the windpipe and esophagus can shift around under the neck skin to fall in the notches 32 between the tabs 31 so that the windpipe and esophagus will not be caught thereby.

After the neck has been caught between the holding chain 26 and the finger chain 35, the unsevered portion of the neck skin above the holding chain 26 and finger chain 35 passes between the upstream ends of the perforating chain 50 and gripping chain 61. As the chains 50 and 51 move toward each other, the neck skin as well as the windpipe and esophagus will be gripped between the gripping surface 60 on the belt 59 carried by the perforating chain 50 and the tubular belt 66 carried by the gripping chain 61 (see FIG. 8). At the same time, the spikes 55 on the perforating chain 50 will form perforations in the unsevered portion of the neck skin gripped between the chains 50 and 61 at a position immediately below the position where the neck skin is gripped. The chains 50 and 61 do not shift with respect to the poultry carcass as the bird moves through the neck removal machine. This positively holds the windpipe and esophagus to prevent them from being inadvertantly pulled from the carcass as the neck is removed. The perforation of the neck skin below the point where it is gripped serves to weaken the neck skin sufficiently to insure that it will break along the perforations as the tabs 31 on the holding chain 26 and the backup plates 40 and finger members 42 on the finger chain 35 force the neck and neck skin downwardly away from the carcass of the bird. Thus, the windpipe and esophagus are retained on the poultry carcass and stripped out from under the neck skin. After the neck has been removed from the poultry carcass, the removed necks are dropped into the water flume 70 while that portion of the neck skin still attached to the poultry carcass as well as the windpipe and esophagus are released from between the perforating chain 50 and the gripping chain 61.

The overhead conveyor OC continues to move the poultry to the pulling station P located immediately downstream of the neck removal station NR. The windpipe and crop pulling machine 80 is located in registration with the poultry passing along the processing path so that the poultry carcass passes above the covers 90 on the pulling machine 80 while the windpipe and esophagus hang down through the opening between the covers 90. The windpipe and esophagus hanging through the opening between the covers 90 move in between the upstream ends of the endless engagement assemblies 82. This causes the windpipe and esophagus to pass between the planar support surface 102 on the V-belts 101 carried by the backup chain 91 and the gripping members 110 carried by the gripper chain 105. As the backup chain 91 and gripper 105 move downwardly at the angle $A_P$, the overhead conveyor OC continues to move the poultry carcass along a fixed height path so that the gripped windpipe and esophagus are pulled from the poultry carcass. It will likewise be appreciated that any crop left in the poultry carcass will be pulled therefrom by the esophagus.

What is claimed as invention is:

1. A method of removing the necks from poultry comprising the steps of:
    conveying the poultry along a processing path in a head lowermost position;
    breaking the necks of the poultry while cutting an opening through the neck skin at its juncture with the body of the bird without severing the windpipe and esophagus;
    inserting a removal member into the opening through the neck skin to engage that portion of the neck broken from the poultry carcass; and
    displacing the removal member away from the poultry carcass to force the broken neck away from the poultry carcass and break the neck skin away from the poultry carcass while leaving the windpipe and esophagus attached to the poultry carcass.

2. The method of claim 1 further comprising the step of engaging the windpipe and esophagus after the neck has been removed and pulling the windpipe and esophagus from the poultry carcass.

3. The method of claim 2 further comprising the step of supporting the unsevered portion of the neck skin as the removal member is displaced from the poultry carcass to cause the unsevered portion of the neck skin to separate along a prescribed path while leaving the windpipe and esophagus attached to the poultry carcass.

4. The method of claim 3 further comprising the step of gripping the neck and neck skin while the removal member is displaced to support the neck and neck skin during removal.

5. The method of claim 4 further comprising the step of perforating unsevered portion of the neck skin along the prescribed path to insure that the unsevered portion of the neck skin will separate along the prescribed path.

6. Apparatus for removing the neck and neck skin from a poultry carcass as the poultry carcass is transported in a head lowermost position by a conveyor where the neck has been broken and an opening has been made in the neck skin at the break yet the broken neck is still attached to the poultry carcass through an unsevered portion of neck skin, and the windpipe and esophagus are not cut at the opening, said apparatus comprising:
    a removal member having a portion thereof sized to be inserted into the opening in the neck skin above the broken neck; and
    drive means for moving said removal member synchronously with the movement of the poultry carcass while effecting displacement of said removal member relative to the poultry carcass to cause said removal member to engage the broken neck within the neck skin and force the broken neck and neck skin away from the poultry carcass to break the unsevered portion of the neck skin to separate the neck and neck skin from the poultry carcass.

7. The apparatus of claim 6 further including holding means for engaging the neck of the poultry carcass in opposition to said removal member to grip the neck and neck skin between said holding means and said removal member yet permit the windpipe and esophagus to slide thereby without being separated from the poultry carcass.

8. The apparatus of claim 6 further including gripping means adapted to engage the unsevered portion of the neck skin as well as the windpipe and esophagus to support same and wherein said drive means moves said gripping means synchronously with the movement of the poultry carcass and while maintaining a relatively fixed position between the poultry carcass and said gripping means.

9. The apparatus of claim 6 further including a plurality of said removal members and endless support means mounting said removal members thereon for movement therewith along an endless path so that said removal members engage the opening in neck skin of the poultry carcasses successively moved by the conveyor.

10. The apparatus of claim 6 further including perforating means for perforating the unsevered portion of the neck skin along a prescribed path to cause the unsevered portion of the neck skin to separate along the prescribed path as said removal member is displaced away from the poultry carcass.

11. The apparatus of claim 8 wherein said gripping means includes a pair of resilient endless belts oriented in a side-by-side relationship in a common plane with adjacent inboard flights arranged to grip the unsevered portion of the neck skin therebetween.

12. Apparatus for pulling the windpipe and esophagus out of the poultry carcass after the neck has been removed therefrom comprising a pair of endless flexible support members trained for movement around endless paths in a side-by-side relationship; first resilient gripping means mounted on one of said endless support members and defining a first substantially continuous resilient gripping surface thereon along the length of said support member; second non-resilient gripping means mounted on the other of said endless support members and defining a second substantially continuous nonresilient surface thereon along the length of said support member so that the windpipe and esophagus are engaged and held between said first and second gripping means without severing same; and drive means for moving said gripping means synchronously with each other and with the movement of the poultry carcass while effecting displacement of said support members and said gripping means relative to the poultry carcass to cause said gripping means to pull the windpipe and esophagus out of the poultry carcass.

13. Apparatus of claim 12 wherein said second gripping means includes a plurality of gripping members mounted on said support member in an end-to-end relationship, each of said gripping members defining a cutout therein and including an extension thereon opposite said cutout so that said extension on each of said gripping members extends into one of said cutouts in an adjacent gripping member to define said substantially continuous gripping surface along the length of said endless support member.

14. Apparatus for removing the necks from poultry carcasses being conveyed along a processing path in a head lowermost position comprising:
neck breaking means for breaking the necks of the poultry while cutting an opening through the neck skin at its juncture with the body of the carcass without severing the windpipe and esophagus;
neck removal means including a plurality of removal members having portions thereof sized to be inserted into the opening in the neck skin above the broken neck and for engaging the broken neck of the poultry and removing each broken neck of the poultry from the poultry carcass by displacement of the removal member away from the poultry carcass while leaving the windpipe and esophagus attached to the poultry carcass; and
pulling means including a pair of endless gripping means arranged side-by-side for selectively engaging the windpipe and esophagus therebetween while attached to the poultry carcass after the neck has been removed and pulling the windpipe and esophagus out of the poultry carcass by causing displacement of the endless gripping means away from the poultry carcass.

* * * * *